Patented July 3, 1923.

1,460,476

UNITED STATES PATENT OFFICE.

JAMES R. CAMPBELL AND JAMES L. REYNOLDS, OF SCOTTDALE, PENNSYLVANIA.

WELDING COMPOUND.

No Drawing.  Application filed October 7, 1921. Serial No. 506,113.

*To all whom it may concern:*

Be it known that we, JAMES R. CAMPBELL and JAMES L. REYNOLDS, citizens of the United States, and residents of Scottdale, in the county of Westmoreland and State of Pennsylvania, have invented a new and useful Welding Compound, of which the following is a specification.

This invention relates to a new and useful composition of matter to be used as a welding compound or flux.

The compound is useful in restoring burnt tool steel to its original state, and for welding tool steel, cast steel or cast iron. When used in welding cast iron the compound will leave the metal in the weld practically the same as original cast iron, and of such a nature that it may be readily machined.

The compound of this invention consists of the following ingredients combined in the proportions stated—

|  | Per cent. |
|---|---|
| Oxide of iron | 5 to 10 |
| Black manganese dioxide | 15 to 30 |
| Borax | 80 to 60 |

A typical composition which it is known will give good results is oxide of iron 5 per cent, black manganese dioxide 25 per cent, and borax 70 per cent. These ingredients are thoroughly mixed so as to form an even mixture and the surfaces of the article or articles to be welded are covered therewith similar to the well-known manner of applying other welding compounds or fluxes.

We claim:—

1. A welding compound consisting of oxide of iron, black manganese dioxide, and borax, said borax predominating.

2. A welding compound consisting of a small amount of oxide of iron, a greater amount of black manganese dioxide, and a still greater amount of borax.

3. A welding compound consisting of 5 to 10 per cent of oxide of iron, 15 to 30 per cent of black manganese dioxide, and 80 to 60 per cent of borax, all commingled and mixed together to form an even mixture.

In testimony whereof, we have hereunto set our hands.

JAMES R. CAMPBELL.
JAMES L. REYNOLDS.